(12) United States Patent
Vanstone (10) Patent No.: US 9,071,445 B2
(45) Date of Patent: *Jun. 30, 2015

(54) METHOD AND SYSTEM FOR GENERATING IMPLICIT CERTIFICATES AND APPLICATIONS TO IDENTITY-BASED ENCRYPTION (IBE)

(71) Applicant: Certicom Corp., Mississauga (CA)

(72) Inventor: Scott A. Vanstone, Campbellville (CA)

(73) Assignee: Certicom Corp., Mississauga, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/887,120

(22) Filed: May 3, 2013

(65) Prior Publication Data

US 2013/0318342 A1 Nov. 28, 2013

Related U.S. Application Data

(63) Continuation of application No. 12/170,658, filed on Jul. 10, 2008, now Pat. No. 8,457,307.

(60) Provisional application No. 60/950,262, filed on Jul. 17, 2007.

(51) Int. Cl.
   *H04L 29/06* (2006.01)
   *H04L 9/32* (2006.01)
   *H04L 9/30* (2006.01)

(52) U.S. Cl.
   CPC ............ *H04L 9/3263* (2013.01); *H04L 9/3073* (2013.01)

(58) Field of Classification Search
   CPC ....... H04L 9/3263; H04L 9/3073; H04L 9/30; H04L 9/3294
   USPC ............... 380/30, 44, 277; 713/155–156, 175
   See application file for complete search history.

(56) References Cited

U.S. PATENT DOCUMENTS

| 5,136,646 A | 8/1992 | Haber et al. |
| 5,136,647 A | 8/1992 | Haber et al. |
| 5,199,070 A | 3/1993 | Matsuzaki et al. |
| 5,511,121 A | 4/1996 | Yacobi et al. |
| 5,850,442 A | 12/1998 | Muftic |

(Continued)

FOREIGN PATENT DOCUMENTS

| CA | 2232936 | 9/1999 |
| CA | 2350118 | 12/2001 |

(Continued)

OTHER PUBLICATIONS

"Boneh, D. et al; ""Identity-Based Encryption from the Weil Pairing""; SIAM J. of Computing; 2003; pp. 586 to 615; vol. 32, No. 3".

(Continued)

*Primary Examiner* — Samson Lemma
(74) *Attorney, Agent, or Firm* — Fish & Richardson P.C.

(57) ABSTRACT

The invention relates to a method of generating an implicit certificate and a method of generating a private key from a public key. The method involves a method generating an implicit certificate in three phases. The public key may be an entity's identity or derived from an entity's identify. Only the owner of the public key possesses complete information to generate the corresponding private key. No authority is required to nor able to generate an entity's private key.

19 Claims, 3 Drawing Sheets

(56) References Cited

U.S. PATENT DOCUMENTS

| | | | |
|---|---|---|---|
| 5,878,144 A | 3/1999 | Aucsmith et al. | |
| 5,884,272 A | 3/1999 | Walker et al. | |
| 5,937,066 A | 8/1999 | Gennaro et al. | |
| 5,953,420 A | 9/1999 | Matyas et al. | |
| 5,982,898 A | 11/1999 | Hsu et al. | |
| 6,009,177 A | 12/1999 | Sudia | |
| 6,058,188 A | 5/2000 | Chandersekaran et al. | |
| 6,091,820 A | 7/2000 | Aziz | |
| 6,105,006 A | 8/2000 | Davis et al. | |
| 6,202,150 B1 | 3/2001 | Young et al. | |
| 6,212,281 B1 | 4/2001 | Vanstone et al. | |
| 6,226,383 B1 | 5/2001 | Jablon | |
| 6,230,266 B1 | 5/2001 | Perlman et al. | |
| 6,233,685 B1 | 5/2001 | Smith et al. | |
| 6,295,359 B1 | 9/2001 | Cordery et al. | |
| 6,298,153 B1 | 10/2001 | Oishi | |
| 6,335,972 B1 | 1/2002 | Chandersekaran et al. | |
| 6,363,480 B1 | 3/2002 | Perlman | |
| 6,411,716 B1 | 6/2002 | Brickell | |
| 6,424,712 B2 | 7/2002 | Vanstone et al. | |
| 6,446,207 B1 | 9/2002 | Vanstone et al. | |
| 6,483,921 B1 | 11/2002 | Harkins | |
| 6,490,352 B1 | 12/2002 | Schroeppel | |
| 6,490,680 B1 | 12/2002 | Scheidt et al. | |
| 6,535,978 B1 | 3/2003 | Padgett et al. | |
| 6,564,320 B1 | 5/2003 | De Silva et al. | |
| 6,615,347 B1 | 9/2003 | De Silva et al. | |
| 6,615,350 B1 | 9/2003 | Schell et al. | |
| 6,772,331 B1 | 8/2004 | Hind et al. | |
| 6,792,530 B1* | 9/2004 | Qu et al. | 713/156 |
| 6,820,063 B1 | 11/2004 | England et al. | |
| 6,842,523 B1 | 1/2005 | Niwa et al. | |
| 6,868,408 B1 | 3/2005 | Rosen | |
| 6,889,322 B1 | 5/2005 | Levy | |
| 6,907,401 B1 | 6/2005 | Vittal et al. | |
| 6,950,941 B1 | 9/2005 | Lee et al. | |
| 7,080,404 B2 | 7/2006 | Abdo et al. | |
| 7,095,852 B2 | 8/2006 | Wack et al. | |
| 7,188,258 B1 | 3/2007 | Aggarwal et al. | |
| 7,269,256 B2 | 9/2007 | Rosen | |
| 7,391,868 B2* | 6/2008 | Qu et al. | 380/277 |
| 7,512,974 B2 | 3/2009 | Callaghan et al. | |
| 7,822,974 B2 | 10/2010 | Kinser et al. | |
| 2002/0038420 A1 | 3/2002 | Collins | |
| 2002/0057796 A1 | 5/2002 | Lambert et al. | |
| 2004/0249817 A1 | 12/2004 | Liu et al. | |
| 2005/0114651 A1 | 5/2005 | Qu et al. | |
| 2005/0235148 A1 | 10/2005 | Scheidt et al. | |
| 2006/0104447 A1 | 5/2006 | Lauter et al. | |
| 2006/0206707 A1 | 9/2006 | Kostal et al. | |
| 2006/0253702 A1 | 11/2006 | Lowell et al. | |
| 2007/0100762 A1 | 5/2007 | Luo et al. | |
| 2009/0041238 A1* | 2/2009 | Qu et al. | 380/44 |
| 2009/0046852 A1 | 2/2009 | Vanstone et al. | |
| 2009/0086968 A1 | 4/2009 | Vanstone et al. | |
| 2009/0161876 A1 | 6/2009 | Sherkin | |
| 2010/0121928 A1 | 5/2010 | Leonard | |
| 2011/0087883 A1 | 4/2011 | Campagna et al. | |
| 2012/0036364 A1 | 2/2012 | Yoneda et al. | |

FOREIGN PATENT DOCUMENTS

| | | |
|---|---|---|
| CA | 2505865 | 6/2004 |
| CA | 2593414 | 7/2006 |
| CH | 678134 | 7/1991 |
| EP | 807911 | 11/1997 |
| JP | 05-48599 | 2/1993 |
| JP | 2005-311772 | 11/2005 |
| WO | 99/49612 | 9/1999 |

OTHER PUBLICATIONS

"Boneh, D. et al; ""Identity-Based Encryption from the Weil Pairing""; Advances in Cryptology, Crypto 2001; Proceedings of the 21st Annual International Conference; Santa Barbara, CA; Aug. 19 to 23, 2001; LNCS; vol. 2139; Aug. 19, 2001; pp. 213 to 229; Springer; Berlin, Germany;ISBN: 978-3-540-42456-7".

"Brown, D.R.L. et al.; ""Provably Secure Implicit Certificate Schemes""; Research Report, University of Waterloo, Dept. of C&O; Nov. 2000. Available at www.cacr.math.uwaterloo.caltechregorts/ 200Q/corr2000-55.ps".

Brown, D.R.L. et al.; "Provably Secure Implicit Certificate Schemes"; Financial Cryptography; Jan. 1, 2002; pp. 156-165; vol. 2339; ISBN: 978-58113-764-4.

Brumley, B.B. et al. "Differential Properties of Elliptic Curves and Blind Signatures"; Oct. 9, 2007; pp. 376 to 389; LNCS; Springer-Verlag, Berlin.

Carnerero, Alvaro; European Search Report from Correspodning European Application No. 09010612; search completed Dec. 3, 2009.

Danisch, H. "The Exponential Security System TESS: An Identity Based Cryptographic Protocol for Authenticated Key-Exchange", "RFC 1824", Aug. 1995, pp. 1-21.

Engel, Lawrence J.; International Search Report for corresponding PCT Application No. PCT/CA2010/001393; received by applicant Jan. 24, 2011.

Girault, M. "Self-Certified Public Keys", LNCS 547, Advances in Cryptology—Eurocrypt '91, 1991; Springer-Verlag, Germany; pp. 490-497.

Gunther, C., "Identity-Based Key-Exchange Protocol", LNCS 434, Advances in Cryptology—Eurocrypt '89, 1990; Springer-Verlag, Germany, pp. 29-37.

Haber, Stuart et al.; "How to Time-Stamp a Digital Document"; Journal of Cryptography, pp. 99-111; 1991; vol. 3, No. 2; Springer, New York.

"Haller, N.; ""The S/KEY One-Time Password System""; IETF RFC 1760; Feb. 1995. Available at www.ietf.org/rfc/rfc/760.txt".

Hoger P., Self-Certified Keys—Concepts and Applications, 1997, pp. 1-15, Postdoctoral Fellowship Paper of the NATO Scientific Committee disseminated by the DAAD, Paris, France.

Huang, Qiang et al.—Association for Computing Machinery; "Fast authenticated Key Establishment Protocols for Self-Organizing Sensor Networks"; ACM WSNA 2003; Proceedings of the 2nd ACM International Workshop on Wireless Sensor Networks & Applications; XP009137731; New York; Jan. 1, 2003; pp. 141-150; ISBN: 978-58113-764-4.

Information Technology—Open Systems Interconnection—The Directory: Public-Key and Attribute Certificate Frameworks; X.509 (08/05), ITU-T Standard in Force (I), International Telecommunication Union, Geneva, CH, No. X.509 (08/05, Aug. 29, 2005, XP017405086, p. 6.

Law et al. "An Efficient Protocol for Authenticated Key Agreement"; Designs, Codes and Cryptography: Mar. 2003; pp. 119-134; vol. 28, No. 2; Kluwer Academic Publishers.

Manet, P.; Supplementary Search Report from corresponding European Application No. 08772876.2; search completed Jun. 22, 2011.

Manet, Pascal.; Search Report from European Application No. 10165765.8; search completed Oct. 29, 2010.

Menezes et al. "Elliptic Curve Cryptosystems and Their Implementation", Journal of Cryptology, International Association for Cryptologic Research, 1993, vol. 6, No. 4; pp. 209-224.

Menezes et al., "Handbook of Applied Cryptography", 1996, CRC Press, pp. 520-524, 559-563.

Peterson et al. "Self-Certified Keys—Concepts and Applications", Ecole Normale Superieure in Paris and the University of Klagenfurt in Austria, 1997, pp. 1-15.

"Pintsov L. et al.; ""Postal Revenue Collection in the Digital Age""; FC 2000; 2001; pp. 105 to 120; Springer-Verlag".

Rivest R., Can We Eliminate Certificate Revocation Lists?, Feb. 1998, pp. 178-183, Financial Cryptography. International Conference.

"Shamir. A; ""Identity-Based Cryptosystems and Signature Schemes""; Advances in Cryptology: CRYPTO '84;1985pp. 47 to 53; Springer-Verlag, Germany".

Struik, et al.; Sec. 4: Elliptic Curve Qu-Vanstone Implicit Certificate Scheme (ECQV), v. 0.91; Oct. 17, 2008; p. 22; XP007914511; retrieved from http://www.secg.org/download/aid-775/sec4-ECQV-v091.pdf; sections 1.1, 2.4, 2.5.

(56) References Cited

OTHER PUBLICATIONS

Yoon, Eun-Jun et al.: "An Optimizing Authenticated Key Exchange Protocol for Self-Organizing Sensor Netowrks"; Jan. 1, 2006; pp. 537-546; Ubiquititous Computing Systems LNCS; ISBN: 978-3-540-46287-3.

Yung-Kao Hsu et al., Intranet Security Framework Based on Short-Lived Certificates, Jun. 20, 1997, pp. 228-233, Proceedings of the 6th IEEE Workshops on Enabling Technologies: Infrastructure for Collaborative Enterprises, IEEE Computing Soc., Cambridge, MA, USA.

"Zimmerman, P.R., PGPfone: Pretty good privacy phone owner's manual; Appendix E: Biometric Word Lists; Jan. 1996. Available at http://web.mit.edu/network/pqpfone/manual/index.html".

"Search Report from PCT/CA2008/001260 completed Nov. 19, 2008, received by applicant Dec. 20, 2008."

International Search Report and Written Opinion of the ISA; PCT/US2010/033754; mailed Sep. 1, 2010.

European Search Report dated Jul. 1, 2011 in corresponding Application No. 10176073.

Prosecution History of U.S. Patent No. 6,792,530.
Prosecution History of U.S. Patent No. 7,391,868.
Prosecution History of U.S. Patent No. 7,480,795.
Prosecution History of U.S. Patent No. 7,653,201.
Prosecution History of U.S. Appl. No. 13/285,749.
Prosecution History of U.S. Appl. No. 12/814,210.
Prosecution History of U.S. Appl. No. 12/878,145.
Prosecution History of U.S. Appl. No. 12/774,568.
Prosecution History of U.S. Patent No. 8,270,601.
Prosecution History of U.S. Patent No. 8,069,347.
Menezes et al., "Handbook of Applied Cryptography", 1996, CRC Press, Chapter 13; pp. 543-590.
Communication Pursuant to Article 94(3) EPC dated Sep. 30, 2014 in EP Application No. 08772876.2.

* cited by examiner

| Phase | CA | Bob | Alice |
|---|---|---|---|
| Registration | | $r \in_R [1, n-1]$ <br> $R = r * G$ | |
| | $\xleftarrow{I_1, R}$ | $\xrightarrow{I_2}$ | |
| Publication | | $\xleftarrow{I_1, I_2}$ | |
| | $k_{I1,I2,I3} \in_R [1, n-1]$ <br> $P = R + k_{I1,I2,I3} * G$ <br> $h = H(P, I_1, I_2, I_3)$ <br> $s = k_{I1,I2,I3} * h + c \bmod n$ | $\xrightarrow{P; I_3}$ | $h = H(P, I_1, I_2, I_3)$ <br> $B = h*P + C$ <br> $M = ENC_B(m)$ |
| | | $\xleftarrow{M, I_2, I_3}$ | |
| Privatization | | $\xleftarrow{(I_1, I_2, I_3)}$ | |
| | $s = k_{I1, I2, I3} * h + c \bmod n$ | $\xrightarrow{(P, s)}$ | $h = H(P, I_1, I_2, I_3)$ <br> $b = r * h + s \bmod n$ <br> $m = DEC_b(M)$ |

Three-Phase Implicit Certification

METHOD AND SYSTEM FOR GENERATING IMPLICIT CERTIFICATES AND APPLICATIONS TO IDENTITY-BASED ENCRYPTION (IBE)

CROSS-REFERENCE TO RELATED APPLICATIONS

This application is a continuation of U.S. patent application Ser. No. 12/170,658 filed on Jul. 10, 2008, which claims priority from U.S. Provisional Patent Application No. 60/950,262 filed on Jul. 17, 2007; the entire contents of both applications are incorporated herein by reference.

FIELD OF INVENTION

The invention relates generally to the field of encryption. In particular, the invention relates to a system and method for providing implicit certificates that can be used in an identity-based encryption system.

BACKGROUND OF INVENTION

Public key cryptography utilizes a public key and a private key that are mathematically related. The relationship is such that the public key can readily be computed from the private key but computation of the private key from the public key is considered infeasible. The private key is thus maintained secret. The keys are used in a variety of well known protocols to secure or sign messages. To secure a message, the public key of the recipient is used by the sender to encrypt the message and the recipient uses his private key to decrypt the message. To sign a message, the author uses her private key to generate a signature which can be verified by use of the public key by any recipient. In each case, the public key has to be obtained from a trusted party, such as a trusted authority ("TA").

In identity-based public key cryptography, an entity's public key is its identity, such as an e-mail address, or a derivation thereof. An identity-based encryption ("IBE") system has numerous advantages, most notably:

1. No need for a sender to obtain a public key before encrypting a message;
2. Encryption can be done by the sender before the recipient possesses a private key;
3. Identities can be chosen by the sender, not just the recipient;
4. Existing identities and addresses can be made into public keys; and
5. Public keys can be humanly memorizable.

Many identity-based encryption schemes have been proposed. In one simple scheme, each user is responsible for generating its own private/public key pair. The user does not disclose its private key to anyone, including the TA. Each user may simply adopt its public key as its identity, for example, using it as an e-mail or website address. The user, however, would have to be content with whatever public key that may be generated and use it (or a representation thereof) as its identity, such as an e-mail address or website address. There are other IBE schemes proposed as well, but none has been deemed practical.

It is an object of the present invention to mitigate or obviate at least one of the above mentioned disadvantages.

SUMMARY OF INVENTION

In one embodiment, an IBE system is based on implicit certificates issued by a certification authority ("CA"). In a pre-certification phase of the implicit certification process a recipient requests a certificate but then receives its implicit certificate only after it receives an encrypted message from a sender who chooses the identity of the recipient. The certification authority issues the implicit certificate to the sender and recipient as needed, and does the necessary authentication (identity proofing) along the way. The certification authority, however, does not have possession of the private key of the recipient. The recipient constructs its own private key by combining the implicit certificate received from the CA, its own secret contribution and any public information related to the recipient that may be selected by any one of the recipients, the CA and the sender. In this scheme, both the public key and the private key of the recipient are based on the recipient's identity.

In one aspect of the invention, there is provided a method of transmitting messages encrypted with identity-based public keys derived from information provided by a certification authority. The certification authority has a pair of public and private keys. The method includes the steps of providing a recipient's registration request and registration information to the certification authority, the registration information including the recipient's identity information selected by the recipient and the registration request correlating to a first secret value selected by the recipient; providing the recipient selected identity information to a sender; upon receiving a request from the sender and another of the recipient's identity information selected by the sender, the certification authority generating a public key reconstruction data from the registration request, the registration information, the sender selected identity information of the recipient, a second secret value selected by the certification authority and a certificate information selected by the certification authority; transmitting an implicit certificate to the sender, the implicit certificate including the public key reconstruction data and the certificate information; reconstructing a public key of the recipient from the implicit certificate, the certificate information and the certification authority's public key; and transmitting to the recipient a message encrypted with the public key of the recipient together with an indication that the public key is reconstructed from the implicit certificate.

To decrypt a message received from the sender, the recipient transmits a private key request to the certification authority, the private key request includes all identity information of the recipient used during generating the implicit certificate. The certification authority then provides a private key reconstruction data and the public key reconstruction data to the recipient for the recipient to reconstruct its private key. The private key reconstruction data is generated by combining mathematically the certification authority's private key, the all identity information, the public key reconstruction data, and the second secret value. A private key of the recipient is generated from the implicit certificate, the certification information, the private key reconstruction data and the first secret value.

In another aspect of the invention, there is provided a method of providing a recipient's public key to a sender and a private key corresponding to said public key to the recipient. The method includes the following steps. First, said recipient selects a secret contribution to said public key and generates a registration request information from said secret contribution, and then provides said registration request information and a first identify information associated with the recipient to a certification authority. A sender, when requiring the recipient's public key, transmits to the certification authority a request for an implicit certificate of the public key, said implicit certificate request including said first identity information and a second identity information of the recipient. The certificate authority generates a public key reconstruction data from the registration request information, the first and second identity information, a certificate information selected by the certification authority and a private contribution selected by the certification authority, and transmits said implicit certificate to the sender, the implicit certificate including said public key reconstruction data and said certificate information. The sender computes the public key from the implicit certificate and the certification authority's public key and uses the public key for exchanging information with the recipient. The recipient, when requiring its private key to decrypt message received from the sender, send a private key request to the certification authority. The certification authority generates and provides a privatization information to the recipient, along with the implicit certificate. The recipient then computes the private key from the implicit certificate and the privatization information.

In other aspects the invention provides various combinations and subsets of the aspects described above.

BRIEF DESCRIPTION OF DRAWINGS

For the purposes of description, but not of limitation, an embodiment or embodiments of the invention will now be explained in greater detail by way of example with reference to the accompanying drawings, in which.

DETAILED DESCRIPTION OF EMBODIMENTS

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Figure 1:
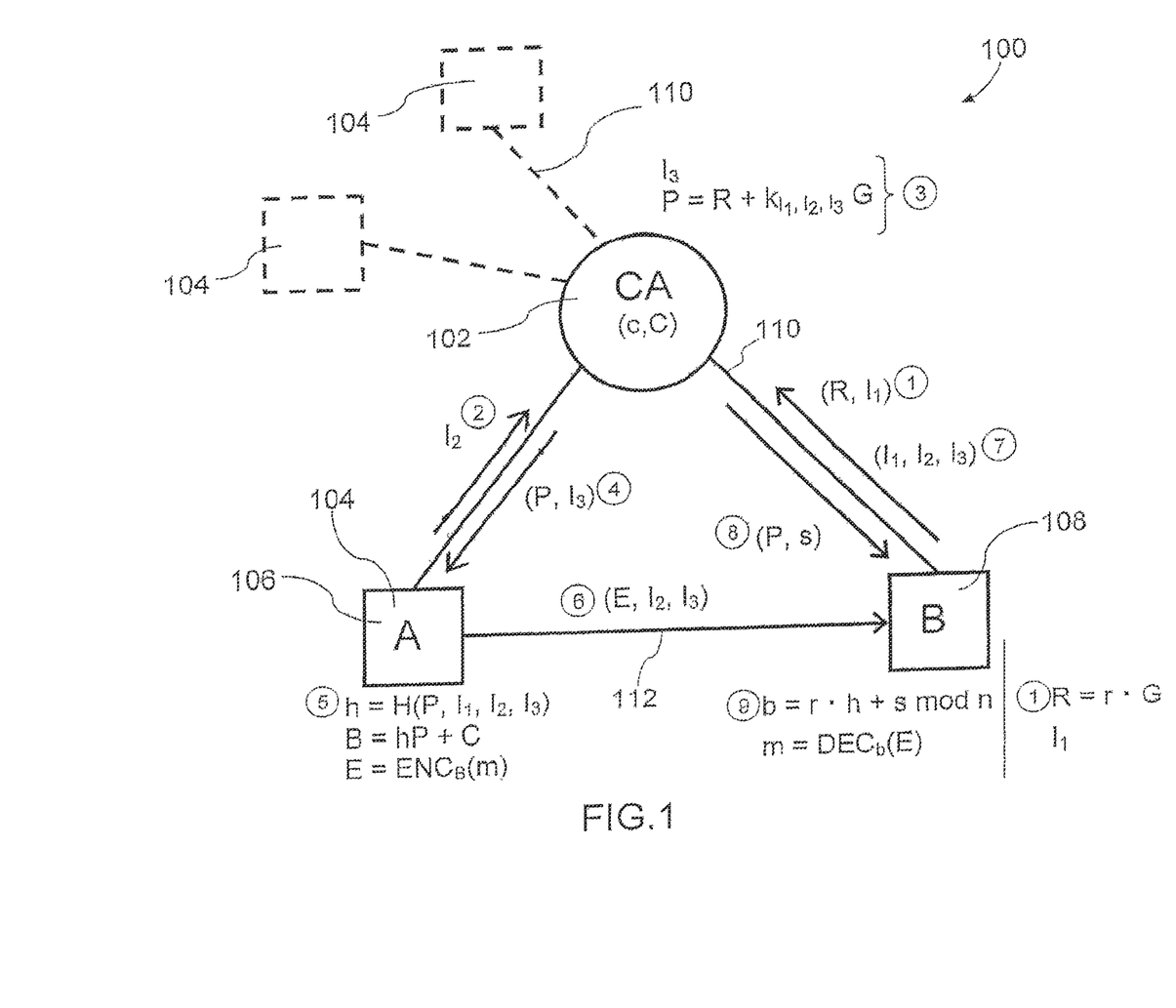
FIG. 1 is a diagram illustrating schematically an IBE system, in which one member of the system acts as a certification authority.

FIG. 1 illustrates schematically an IBE system 100, which includes a central certification authority 102. The IBE system 100 has a number of users, or entities 104, including a sender 106 (or more commonly called sender Alice, or sender A) and a recipient 108 (or more commonly called recipient Bob, or recipient B). Each user 104 communicates with the CA 102 through a communication link 110. The CA is a central certification authority but not a trusted authority.

Sender 106 and recipient 108 exchange messages through a communication channel 112 between the pair of users. When sender 106 needs to send a message, sender 106 generates a session key z to encrypt the message. The session key z is constructed from the public key of recipient 108 and the sender's own private key. The result of the encryption, namely, encrypted message, is sent to recipient 108 through communication channel 112. The public key of recipient 108 is derived from the identity information of recipient 108 in a systemic manner described herein. The recipient 108 likewise generates a session key z from his private key and the public key of the sender so as to decrypt the message. The private key is computed by the recipient 108 from information possessed by the CA 102 and a secrete contribution to the private key from the recipient 108 itself.

The general relationship between a private key and the secret contribution to the private key from its owner is the same for all users. This is desirable as all users may use the same correspondence for constructing their own private keys. The recipient 108 therefore must keep secret its contribution to its own private key so that not everyone can compute its private key from the general relationship.

The CA does not need to be trusted by any user in that the CA does not possess any private key of any user. It is sufficient that the CA possesses sufficient information about a user so that the user's identity can be authenticated by the CA. Instead of possessing private keys of all users, the CA 102 provides the necessary data for the recipient 108 to construct its private key when needed. Likewise, the CA also provides the necessary data for the sender 106 to construct a public key of the recipient 108 when needed. In a scheme described below, the CA sends an implicit certificate to the sender for the sender to compute the public key of the recipient and to the recipient to compute its corresponding private key.

The IBE system 100 may be implemented on any message exchange network. For example, the communication system 100 may be based on postal mail. Each user is identified by a name and a postal address. The delivery of mail by postal offices establishes the communication channel 112. The communication system 100 may also be an electronic message network system. Each user has a network address at which the user can be reached. The communication channel 112 is then a network connection that links the pair of users. For example, in case the communication system is an e-mail system, the network address is an e-mail address. In case the communication system is a mobile phone text message system, the network address is a phone number. The connection between the pair of users may be an internet-based connection or a public switch exchange based connection, or any other suitable data communication link.

Although here one user is designated as sender 106, the same description applies when the pair of users reverse roles, namely when the other user sends electronic messages. It is only for the convenience of description that one user is designated a sender and the other user is designated a recipient.

Further, in this specification, "sender" is used interchangeably to refer to a user of the system who sends messages, a message software program employed for sending electronic messages by the user such as an e-mail program, or a general-purpose computer on which the message program for sending electronic messages is executed, unless the context requires otherwise. The general-purpose computer typically has a CPU, a memory storage device and a storage device, both accessible to CPU, and input/output (I/O) devices. The message program may be stored on the storage device. Likewise, the term "recipient" is used interchangeably to refer to a user of the system who receives messages, a message software program employed by the user for receiving electronic messages or a general-purpose computer on which the message program for receiving electronic messages is executed, unless the context requires otherwise.

Figure 2:
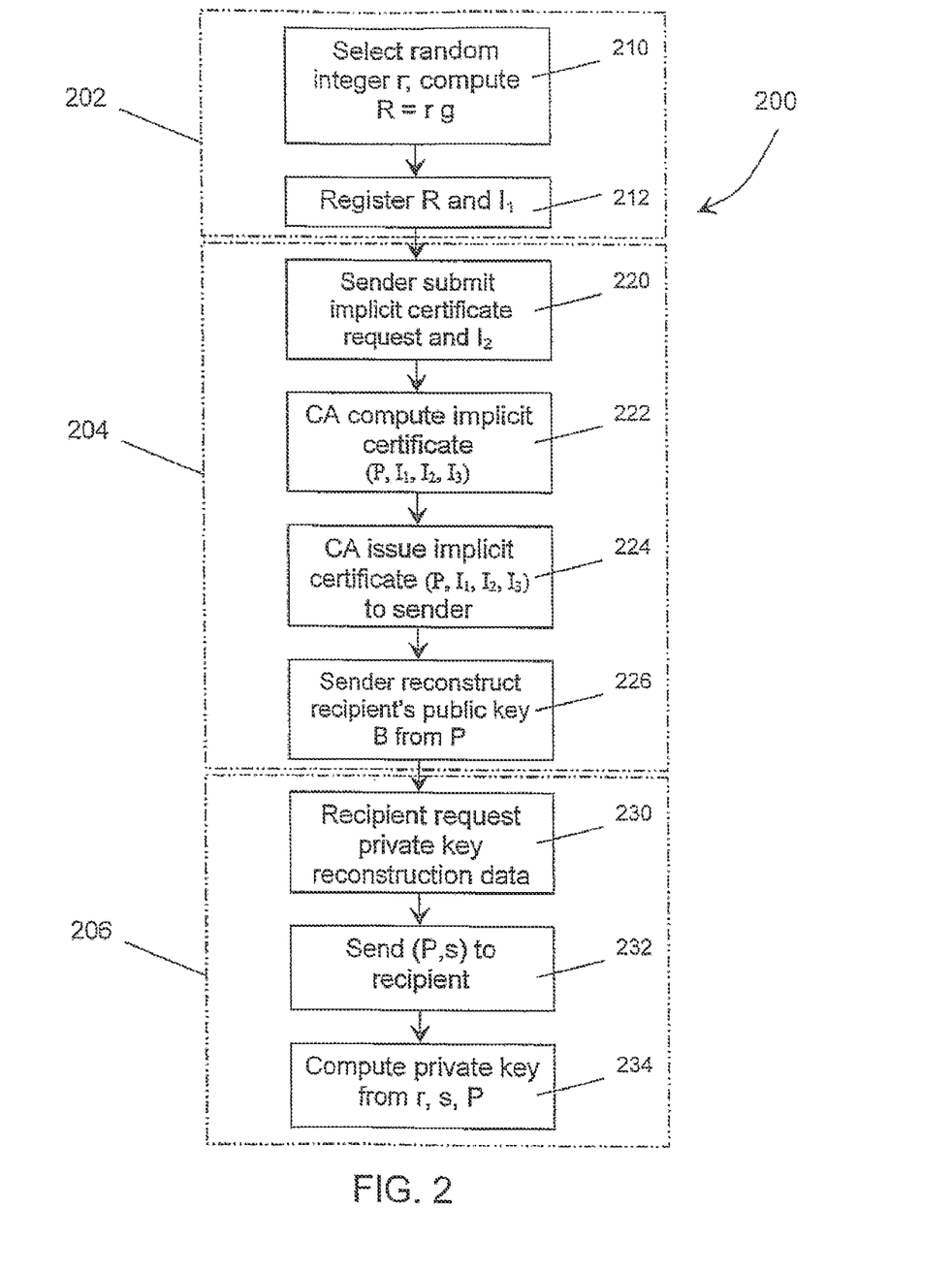
FIG. 2 is a flowchart illustrating schematically steps of a method for issuing implicit certificates and computing public/private key pairs for use in the IBE system shown in FIG. 1.
Figure 3:
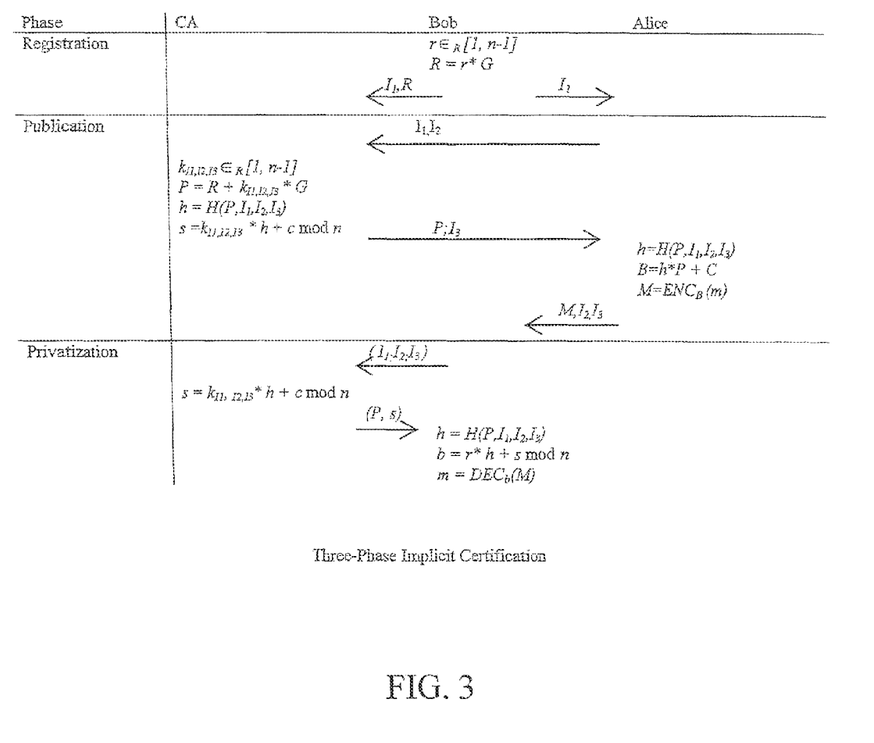
FIG. 3 is a table summarizing a method of three-phase implicit certification.

Referring to FIG. 2, there is shown schematically a method of issuing implicit certificates for users to reconstruct public and private keys. According to this method, certificates are issued in several phases, and in such a way as to achieve many of the benefits of identity based encryption. The method is a process 200, as summarized in FIG. 3, that includes at least three phases. The three phases are registration 202, publication 204 and privatization 206.

During registration 202, a recipient Bob 108 registers to a certification authority 102. Bob 108 registers by submitting to the CA 102 a registration request R and his registration information. The registration information includes his identity-related information $I_1$, such as his e-mail address. The registration request is derived from a secret contribution such as a secret number, r, from the recipient Bob 108. The secret contribution r is known to Bob only, while both Bob 108 and the CA 102 keep the registration request R confidential between them. Preferably, the registration request R is derived from a cryptographic operation on the secret contribution r so that the CA cannot have any knowledge of r.

The following is an example of computing R from a secret contribution in an elliptic curve cryptosystem. The recipient Bob 108 first at step 210 selects a random integer r in the range [1, n−1] as his secret contribution, where n is the order of the elliptic curve group E with a generator point G. The registration request R is a product of the integer r and the generator G of the elliptic curve group E:

$$R=r*G$$

At step 212, the recipient Bob 108 submits $I_1$ and R to the certification authority 102 over a secure channel. Bob does not reveal r to anyone at all. R is disclosed to the CA, but not anyone else. Bob's identity-related information $I_1$, however, is made generally available, in particular to the sender Alice 106. Bob can do so, for example, by sending it directly to Alice; alternatively Alice 106 can retrieve it from a public directory service such as the certification authority 102.

During registration 202, the certification authority 102 does not issue an implicit certificate to Bob, but does obtain security information from Bob and check Bob's credentials according to its policies so that it is able to issue an implicit certificate for Bob later. As will become clear later, the registration request R contributes to Bob's public key B and private key b while his secret number r contributes only to his private key b.

During publication 204, the sender Alice 106 asks the certification authority 102 to issue an implicit certificate for Bob (step 220). The certification authority 102 computes an implicit certificate (step 222) and issues the implicit certificate to Alice (step 224). Alice 106 computes at steps 226 Bob's public key from the implicit certificate received.

When requesting for the issuance of an implicit certificate at step 220, Alice 106 selects and includes another piece of information $I_2$ that relates to Bob's identity. For example, Alice can select parameters such as Bob's birth date, age or nationality.

At step 222, the certification authority 102 establishes identity-related information $I_3$ selected from Bob's credentials as certificate information and computes an implicit certificate as described below. For the set of identity-related information $I_1$, $I_2$ and $I_3$, the certification authority 102 first selects a random integer $k_{11,12,13}$ from the range [1, n−1]. The certification authority 102 notes this correspondence between the set of identity-related information $I_1$, $I_2$ and $I_3$ and the random integer $k_{11, 12, 13}$ selected for this request from the sender. In establishing a correspondence between Bob's identity-related information and the random integer, the certification authority may choose not to use $I_1$, not to use $I_3$ or not to use both. But in general, the identity-related information $I_2$ selected by the sender Alice is always included. For example, the certification authority may compute a pseudorandom number k from a keyed pseudorandom function with $I_2$ as the only identity-related information in the function's input.

The certification authority 102 then computes Bob's reconstruction public data P, a hash value h, and a secret integer s according to the following equations:

$$P=R+k_{11,12,13}*G$$

$$h=H(P,I_1,I_2,I_3)$$

$$s=k_{11,12,13}*h+c \bmod n$$

where H is preferably a secure hash function and c and C are the CA's private and public keys, respectively. The certification authority 102 issues an implicit certificate (P; $I_2$) to Alice 106 at step 224. It should be noted that the implicit certificate (P; $I_2$) is for this request only. It is possible that in another session, either requested by Alice or some other users, the same set of identity-related information $I_1$, $I_2$ and $I_3$ is selected but a different random integer $k'_{11, 12, 13}$ is generated, in which case, there will be a different implicit certificate (P'; $I_2$).

At step 226, Alice 106 computes Bob's public key B by first reconstructing h and then computing B:

$$h=H(P,I_1,I_2,I_3)$$

$$B=h*P+C$$

It is presumed above that the certification authority 102 has already pre-distributed its public key C to Alice 106 and Bob 108 in an authentic manner.

Using Bob's public key B, Alice is able to encrypt her message m to Bob:

$$M=ENC_B(m)$$

Where $ENC_B()$ represents an encryption operation that incorporates Bob's public Key B. The encrypted message M can be sent to Bob in any manner, for example, over a non-secure communication channel 112 between Alice and Bob. In order for Bob to be able to decrypt the encrypted message, Alice also sends $I_2$ and $I_3$ along with the encrypted message M to Bob.

At this point, Bob does not have his private key b associated with the newly issued implicit certificate (P; $I_2$) nor his public key B. Thus, upon receipt of the encrypted message M from Alice 106, Bob 108 is not able to decrypt the message. Instead, Bob is notified by header information associated with the encrypted message or by some other means that the message M has been encrypted with a certain certificate and Bob must determine the private key with assistance of the certification authority 102. Bob determines the private key b during privatization 206 and decrypts the message M once the private key is determined.

During privatization 206, Bob 108 requests the certification authority 102 supply the necessary information that completes the input to his private key generation algorithm. First, at step 230, Bob sends to the certification authority 102 the necessary identifying information $I_2$ and $I_3$ provided by Alice as well as the identifying information $I_1$ initially submitted by Bob during registration 202. At step 232, Bob's request for information is verified. The necessary information required by Bob is the reconstruction of public data P and the CA's secret contribution s: the pair (P, s). To discourage any fraudulent attempt by an adversary, the certification authority 102 first verifies that Bob is who he claims to be, as in registration, and will further check that any extra conditions in the new implicit certificate such as $I_2$, $I_3$ received from Alice, are also met. Once the certification authority is satisfied, it sends Bob the necessary information, (P, s), that Bob needs to complete the calculation of the new private key corresponding to the new implicit certificate (P; $I_2$).

At step 234, Bob reconstructs his private key by computing the hash value h and then his private key b:

$$h = H(P, I_1, I_2, I_3)$$

$$b = r*h + s \bmod n \quad (2)$$

At this point, Bob 108 is able to decrypt the encrypted message M from Alice 106:

$$m = DEC_b(M)$$

It will be appreciated that at no point will the certification authority 102 be able to learn Bob's private key b. In particular, the certification authority does not have nor is able to obtain Bob's private key because Bob's contribution to his private key, r, is always kept secret. The certification authority is therefore not able to decrypt or sign for Bob, even after Bob's public key has gone into active use. In this respect, the certification authority 102 does not need to be a trusted authority, in the sense of conventional identity-based encryption and signatures. In other words, the certification authority needs to be trusted to verify the authenticity of Bob's identity, but does not need to be trusted further. Indeed, Bob's private key is not trusted to the certification authority 102.

Optionally as a further step, Bob 108 can verify the authenticity of the response (P, s) received from the certification authority 102. Bob 108 already knows his contribution $I_1$ to the implicit certificate and his confidential certificate request R. He also has the contribution $I_2$ selected by Alice 106 and $I_3$ selected by the certification authority 102. When Bob receives the response (P,s) to the certificate request R, it is possible for Bob to verify the authenticity of the response by checking that the following equation holds:

$$B = h*R + s*G = h*P + C = B$$

This equation should hold because $$\begin{aligned} B &= b*G \\ &= (h*r + s)*G \\ &= (h*r + h*k + c)*G \\ &= h*(k + r)*G + c*G \\ &= h*P + C \\ &= B \end{aligned}$$

Thus Bob knows the logarithm of B=h P+C with respect to the generator point G. Alice can reconstruct B using only the reconstruction public data P, the certificate information ($I_1$, $I_2$, $I_3$), and the CA's public key C.

The certification authority will generally need to store Bob's certificate request R. When the certification authority generates its contribution $k_{I_1, I_2, I_3}$ to Bob's private key, the certification authority may want to do so by a secret deterministic function of ($I_1$, $I_2$, $I_3$). This way, the certification authority will not need to store $k_{I_1, I_2, I_3}$ separately for each publication of an implicit certificate, nor to record any correspondence between the stored $k_{I_1, I_2, I_3}$ and the set of identity information ($I_1$, $I_2$, $I_3$), or the certificate request R.

In practice, a single registration phase may correspond to many different publication and privatization phases. For example, Alice may request an implicit certificate on a per message basis, so that each private key that Bob computes will only be applicable to one message. Alternatively, many different users may request different implicit certificates for sending their messages to Bob, thus requiring separate publication and privatization phases corresponding to each implicit certificate issued to each of these different users.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:

1. In a communication system comprising at least a certification authority computer of a certification authority, a sender computer of a sender and a recipient computer of a recipient, the certification authority computer, the sender computer and the recipient computer communicating with each other over a communication network, a computer-implemented method of transmitting messages encrypted with identity-based public keys derived from information provided by the certification authority, said certification authority having a pair of public and private keys, said method comprising:

the recipient computer providing a recipient's registration request to the certification authority computer over the communication network, said registration request correlating to a first secret value selected by the recipient computer;

upon receiving a request from the sender computer, said request from the sender computer including an identity information of the recipient selected by the sender, the certification authority computer generating a public key reconstruction data from said registration request, said identity information selected by the sender, a second secret value selected by the certification authority computer and a certificate information selected by the certification authority computer;

the certification authority computer transmitting an implicit certificate to the sender computer over the communication network, said implicit certificate including said public key reconstruction data and said certificate information;

wherein said implicit certificate, said certificate information and the certification authority's public key is configured for subsequent use by the sender computer for allowing the sender computer in reconstructing a public key of the recipient; and, wherein said public key of the recipient is configured for subsequent use by the sender computer for allowing the sender computer to encrypt a message with said public key of the recipient and a private key of the sender for transmission of the message to the recipient computer over the communication network.

2. The computer-implemented method of claim 1, further including:

providing another identity information of the recipient to the certification authority computer over the communication network, said another identity information being selected by the recipient, wherein said public key reconstruction data incorporates contribution from said another identity information.

3. The computer-implemented method of claim 1, further comprising:

the recipient computer transmitting a private key request to the certification authority computer, said private key request including all identity information of the recipient used during generating said implicit certificate, the certification authority computer providing a private key reconstruction data and said public key reconstruction data to the recipient computer, said private key reconstruction data being generated by combining mathematically the certification authority's private key, said all identity information, said public key reconstruction data, and said second secret value, wherein a private key of the recipient is generated by the recipient computer from said implicit certificate, said certification information, said private key reconstruction data and said first secret value.

4. The computer-implemented method of claim 1, wherein an elliptic curve encryption scheme is used, and the public key reconstruction data is determined mathematically by the certification authority computer from the formula R+kG, wherein R is the registration request, k is the second secret value selected by the certification authority computer and G is a generator of an elliptic curve group E selected for the elliptic curve encryption scheme.

5. The computer-implemented method of claim 1, wherein the private key of the sender is determined in dependence upon an indication that said public key is reconstructed from said implicit certificate, said indication including said sender selected identity information.

6. A method of issuing certificates at a certificate authority in an identity based encryption system (IBE) to a sender computer and a recipient computer configured for communicating messages encrypted with identity-based public keys derived from information provided by the certification authority, the method comprising:
receiving, during a registration phase, a first value comprising: a registration request R and registration information $I_1$ from the recipient computer which is configured to receive an encrypted message from a sender computer, the registration request derived from a secret value known by the recipient;
receiving, during a publication phase, a request for an implicit certificate P and receiving a second value comprising a second information $I_2$, the second information associated with the recipient and provided by the sender computer;
generating the implicit certificate at the certificate authority in dependence upon the first value and the second value, the implicit certificate for use by the sender computer in generating the recipient's public key B and wherein the recipient's public key is for subsequent use by the sender computer in encrypting the message for transmission to the recipient;
receiving, during a privatization phase, a request from the recipient comprising the registration information and the second information to verify the registration request; and,
providing to the recipient, in response to the request, a private key reconstruction data, for permitting the recipient to decrypt the message provided by the sender.

7. The method of claim 6, wherein the recipient's public key is further configured to be generated in dependence upon the implicit certificate and a public key C of the certificate authority.

8. The method of claim 6 wherein generating the implicit certificate P is further in dependence upon identity related information I3 associated with the recipient's credentials as provided to the certificate authority.

9. The method of claim 6, wherein the registration request R is confidential between the recipient and the certificate authority.

10. The method of claim 9, wherein the registration request R is derived based on a cryptographic operation on the secret value such that the secret value is confidential to the recipient.

11. The method of claim 10, wherein the registration request R is based on a product of the secret value and a generator point G on an elliptic curve cryptographic system.

12. The method of claim 10, wherein the private key reconstruction data comprises: the implicit certificate and a secret contribution s.

13. The method of claim 6, wherein the implicit certificate provided to the sender is in determined mathematically by the certification authority from the formula R+kG, wherein R is the registration request, k is a second secret value selected by the certification authority computer and G is a generator of an elliptic curve group E selected for the elliptic curve encryption scheme.

14. The method of claim 6, wherein the second information provided by the recipient is received from the sender at the recipient.

15. A non-transitory computer readable medium in a communication system comprising at least a certification authority computer of a certification authority, a sender computer of a sender and a recipient computer of a recipient, the certification authority computer, the sender computer and the recipient computer communicating with each other over a communication network, the computer readable medium for transmitting messages encrypted with identity-based public keys derived from information provided by the certification authority, said certification authority having a pair of public and private keys, the computer readable medium comprising instructions for:
providing a recipient's registration request from the recipient computer to the certification authority computer over the communication network, said registration request correlating to a first secret value selected by the recipient computer;
upon receiving a request from the sender computer including an identity information of the recipient selected by the sender, generating at the certification authority computer a public key reconstruction data from said registration request, said identity information selected by the sender, a second secret value selected by the certification authority computer and a certificate information selected by the certification authority computer;
transmitting from the certification authority computer an implicit certificate to the sender computer over the communication network, said implicit certificate including said public key reconstruction data and said certificate information;
wherein said implicit certificate, said certificate information and the certification authority's public key is configured for subsequent use by the sender computer for allowing the sender computer in reconstructing a public key of the recipient; and,
wherein said public key of the recipient is configured for subsequent use by the sender computer for allowing the sender computer to encrypt a message with said public key of the recipient and a private key of the sender for transmission of the message to the recipient computer over the communication network.

16. The non-transitory computer readable medium of claim 15, further comprising computer readable instructions for:
providing another identity information of the recipient to the certification authority computer over the communication network, said another identity information being selected by the recipient, wherein said public key reconstruction data incorporates contribution from said another identity information.

17. The non-transitory computer readable medium of claim 15, further comprising computer readable instructions for:

transmitting at the recipient computer a private key request to the certification authority computer, said private key request including all identity information of the recipient used during generating said implicit certificate, providing at the certification authority computer a private key reconstruction data and said public key reconstruction data to the recipient computer, said private key reconstruction data being generated by combining mathematically the certification authority's private key, said all identity information, said public key reconstruction data, and said second secret value, wherein a private key of the recipient is generated by the recipient computer from said implicit certificate, said certification information, said private key reconstruction data and said first secret value.

18. The non-transitory computer readable medium of claim 15, wherein an elliptic curve encryption scheme is used, and the public key reconstruction data is determined mathematically by the certification authority computer from the formula R+kG, wherein R is the registration request, k is the second secret value selected by the certification authority computer and G is a generator of an elliptic curve group E selected for the elliptic curve encryption scheme.

19. The non-transitory computer readable medium of claim 15, wherein the private key of the sender is determined in dependence upon an indication that said public key is reconstructed from said implicit certificate, said indication including said sender selected identity information.

* * * * *